(12) United States Patent
Murashima

(10) Patent No.: US 6,394,667 B2
(45) Date of Patent: *May 28, 2002

(54) CAMERA AND CAMERA ASSEMBLING METHOD

(75) Inventor: Nobuharu Murashima, Nara (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,446

(22) Filed: Jan. 20, 1999

(30) Foreign Application Priority Data

Jan. 27, 1998 (JP) .......................................... 10-013865

(51) Int. Cl.⁷ .......................... G03B 19/12; G03B 17/02
(52) U.S. Cl. ........................ 396/354; 396/357; 396/535; 396/541
(58) Field of Search ................................ 396/354, 357, 396/358, 439, 535, 541

(56) References Cited

U.S. PATENT DOCUMENTS

| 4,163,612 | A | * | 8/1979 | Ueda et al. ................. 396/357 |
| 4,264,170 | A | * | 4/1981 | Kurei .......................... 396/447 |
| 4,334,752 | A | * | 6/1982 | Johnson et al. ............. 396/535 |
| 4,910,544 | A | * | 3/1990 | Nomuraq ..................... 396/79 |
| 4,962,397 | A | | 10/1990 | Ishikawa et al. ............ 396/208 |
| 5,475,457 | A | * | 12/1995 | Tanaka ......................... 396/83 |
| 5,517,266 | A | * | 5/1996 | Funaki et al. ............... 396/319 |
| 5,669,017 | A | * | 9/1997 | Yamashina et al. ........... 396/6 |
| 5,787,318 | A | * | 7/1998 | Katoh et al. ................ 396/442 |
| 5,915,141 | A | * | 6/1999 | Ebe ............................. 396/470 |

FOREIGN PATENT DOCUMENTS

JP      05119380      5/1993

* cited by examiner

Primary Examiner—David M. Gray
(74) Attorney, Agent, or Firm—Burns, Doane, Swecker & Mathis, LLP

(57) ABSTRACT

Openings 30 are formed in positions that are exposed when the back cover of the camera is opened so that ratchets 14*a* and 14*b* of a shutter unit 10 incorporated in a camera body 1 are seen through the openings 30. After external parts such as a cover are attached and the camera is assembled to a substantially finished state, the back cover is opened. Then, inserting a tool through the opening 30, the ratchet 14*a* or 14*b* is rotated to perform the final adjustment of the screen speed of the shutter unit 10. After the final adjustment, a perforation detection unit 32 is attached to cover the openings 30.

10 Claims, 5 Drawing Sheets

CAMERA AND CAMERA ASSEMBLING METHOD

This application is based on application No. Hei 10-13865 filed in Japan, the content of which is hereby incorporated by reference.

BACKGROUND OF THE INVENTION

1. Field of the Invention

The present invention relates to a camera. This invention relates to a method for assembling a camera.

2. Description of the Prior Art

Conventionally, to adjust a functional unit such as a shutter unit or a mirror box disposed inside the camera body, after a preliminary adjustment is performed unit by unit, a final adjustment is performed with the functional unit incorporated in the camera body. This is done in order to correct accumulated part errors.

For example, as shown in the relevant portion exploded perspective view of FIG. 1, for a shutter unit 2 of a single lens reflex camera, first, the preliminary adjustment of the transport speeds of the leading and the trailing screens is performed unit by unit. Specifically, a worm gear 2w meshing with a gear 2x is rotated or a ratchet 2y being rotatable only in one direction by being engaged with a claw 2v is rotated, thereby adjusting the helix angles, that is, the spring charge forces of transport springs 2s and 2t for driving the leading and the trailing screens. Then, with the shutter unit 2 incorporated in a camera body 1, the final adjustment of the shutter screen speed is performed. Specifically, the worm gear 2w is rotated from above to thereby adjust the speed of the leading screen so as to be the same as that of the trailing screen.

However, the final adjustment in which the worm gear 2w is accessed is necessarily performed with an upper cover, an exterior part of the camera, being detached. Consequently, when the upper cover is attached after the final adjustment, it can occur that the camera body 1 and the shutter unit 2 are distorted to cause the shutter unit 2 to be out of adjustment. Moreover, the access to the worm gear 2w is necessarily secured, for example, by forming a hole in an electrical member such as a flexible circuit board disposed in an upper part of the camera. Further, the worm mechanism complicated in structure compared with a ratchet mechanism is necessarily provided only for the adjustment, so that the lateral size of the camera is increased by the presence of the worm gear 2w.

Moreover, for example, as shown in the relevant portion exploded perspective view of FIG. 2, for a mirror box 4 having a main mirror (not shown) and a sub mirror 4a, after a preliminary adjustment is performed unit by unit and the mirror box 4 is incorporated into the camera body 1, a decentered pin 4t provided on a side surface of the mirror box 4 is rotated to perform the final adjustment of the angle of the sub mirror 4a. Specifically, the decentered pin 4t engages with one end of an interlocking lever 4k rotatably held on the side surface of the mirror box 4, and the rotation of the decentered pin 4t shifts the position of a stopper pin 4s provided at the other end of the interlocking lever 4k. A holder 4b for holding the sub mirror 4a abuts on the stopper pin 4s. Consequently, the rotation of the decentered pin 4t changes the angle of the sub mirror 4a. Such a complicated interlocking mechanism is used in order that the angle of the sub mirror 4a can be adjusted from a position easily accessed from the outside.

However, the final adjustment in which the decentered pin 4t is accessed is necessarily performed with a front cover detached. Consequently, when the front cover is attached after the final adjustment, it can occur that the camera body 1 and the mirror box 4 are distorted to slightly change the angle of the sub mirror 4a. Further, the complicated interlocking mechanism is necessary only for the adjustment of the sub mirror 4a.

As described above, various problems arise with the prior art since the final adjustments of the functional units 2 and 4 are performed in an unfinished state where no exterior parts are attached to the camera.

SUMMARY OF THE INVENTION

Accordingly, an object of the present invention is to provide a camera in which it never occurs that functional units become out of adjustment after the final adjustment of the functional units.

A camera of the present invention is a type in which at least a part of a functional unit is disposed at an interior portion of a camera body which portion is not exposed when a cover is opened in a finished state. In one aspect of the present invention, an opening is formed in an interior portion that is exposed when a cover is opened. A continuous space for inserting an adjustment tool is provided between the opening and the adjustment part of the functional unit.

According to the above-described structure, in the camera body, there is a space (referred to as complete interior) that is not exposed when a cover of the finished camera (e.g. a back cover, a battery chamber cover, a film cartridge chamber cover, or a hiding cover for covering a switch, a display panel or a contact, etc.) is opened, and a space (referred to as quasi-interior) that is not exposed at ordinary times such as at the time of photographing but is exposed when the cover is opened. In the complete interior, at least a part of a functional unit (including an electrical unit such as a flash light emitting unit or a circuit board in addition to a mechanical unit such as a shutter unit or a mirror box) is disposed. In the quasi-interior, an opening is formed. Between the opening and the adjustment part of the functional unit (including an electrical adjustment part by a variable resistance, a DIP switch, a jumper switch or the like in addition to a mechanical adjustment part by a screw, a gear or the like), a continuous space is provided for inserting an adjustment tool. To perform the final adjustment of the functional unit, after the camera is assembled to a substantially finished state, an adjustment tool is inserted through the opening into the adjustment tool insertion space to access the adjustment part of the functional unit with the adjustment tool. Here, the "substantially finished state of the camera" indicates not only the finished state in which the camera is completely finished with all the parts incorporated therein but also a state in which the incorporation of parts has been advanced to such an extent that the incorporation of the remaining parts does not affect the adjustment of the functional unit, that is, does not cause the functional unit to be out of adjustment.

Consequently, the functional unit is not caused to be out of adjustment after the final adjustment thereof.

Preferably, a light intercepting member or a covering for covering the opening is further provided at the opening.

According to the above-described structure, a light intercepting member or a covering is attached to cover the opening after the final adjustment of the functional unit. Since the light intercepting member and the covering are provided only for covering the opening, the attachment of the light intercepting member or the covering does not distort the camera body. Consequently, the attachment of the light intercepting member or the covering does not cause the functional unit to be out of adjustment. Since the light intercepting member intercepts light between the complete interior and the quasi-interior of the camera body, when the film is placed in the quasi-interior of the camera body, film is prevented from being exposed by light from the complete interior of the camera body. Since the access to the adjustment part of the functional unit is inhibited by the light intercepting member or the covering after the final adjustment, the adjustment of the functional unit is not easily changed by the user.

An example of the above-mentioned functional unit is a shutter unit. The adjustment part is a screen adjustment part for adjusting the speed of the shutter screen.

According to the above-described structure, the shutter mechanism can be adjusted without the need for a worm mechanism or a hole in an electrical member required conventionally. Consequently, the structure can be simplified, so that camera size reduction can be achieved.

Another example of the above-mentioned functional unit is a mirror box having a main mirror and a sub mirror. The adjustment part is a sub mirror angle adjustment part for adjusting the angle of the sub mirror.

According to the above-described structure, the mirror box can be adjusted without the need for an interlocking mechanism such as an interlocking lever required conventionally. Consequently, the structure can be simplified, so that camera size reduction can be achieved.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
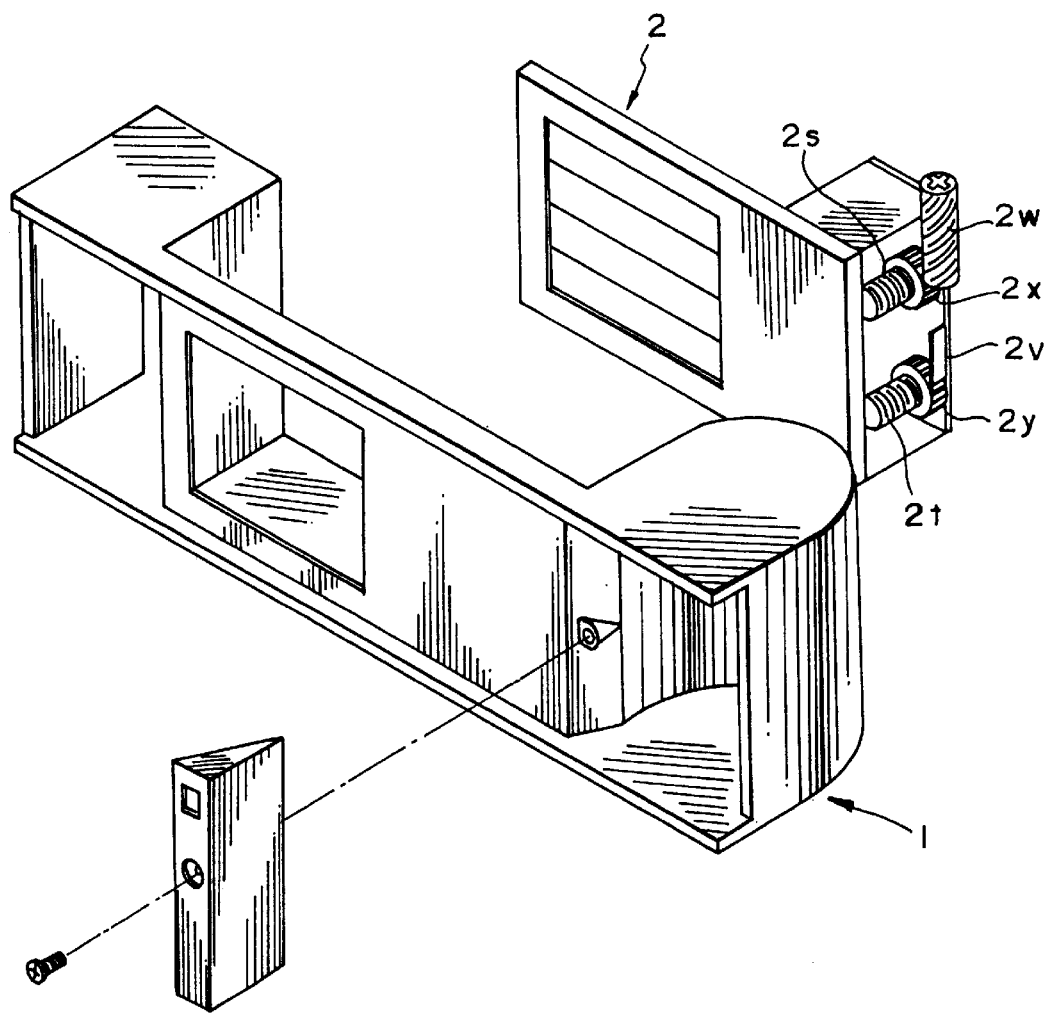
FIG. 1 is an exploded perspective view of the relevant portion of the conventional camera.
Figure 2:
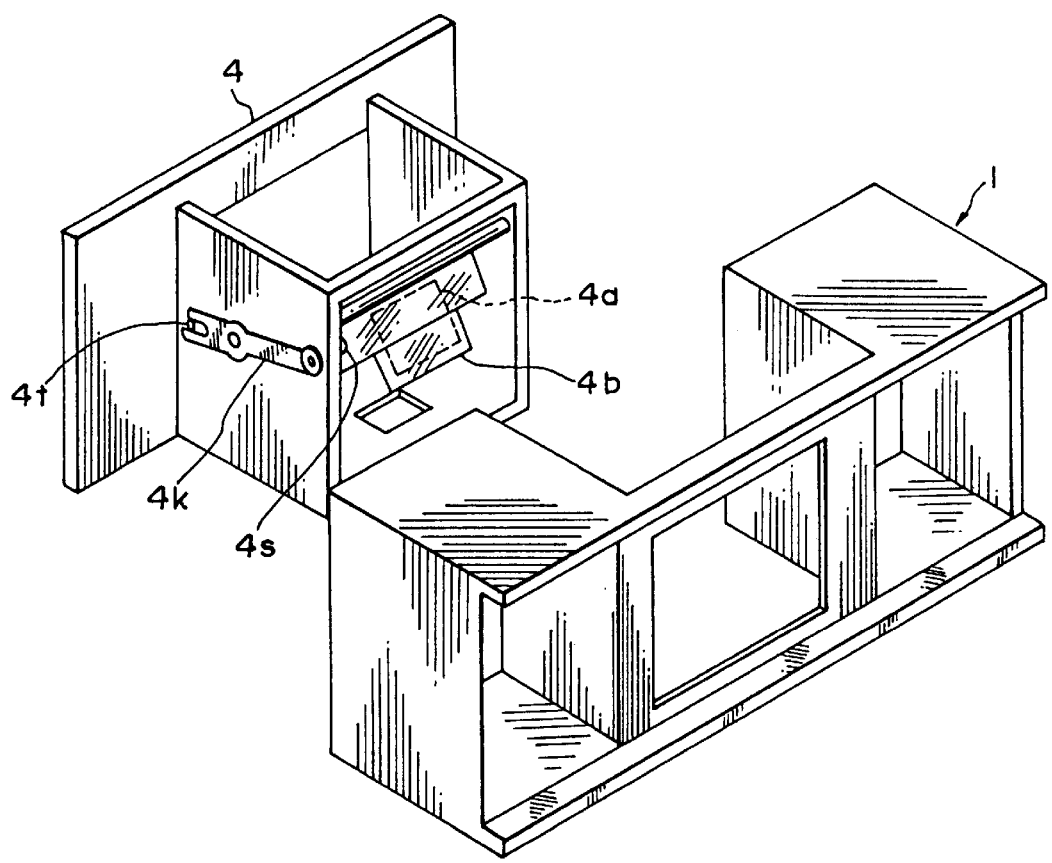
FIG. 2 is an exploded perspective view of the relevant portion of another conventional camera.
Figure 3:
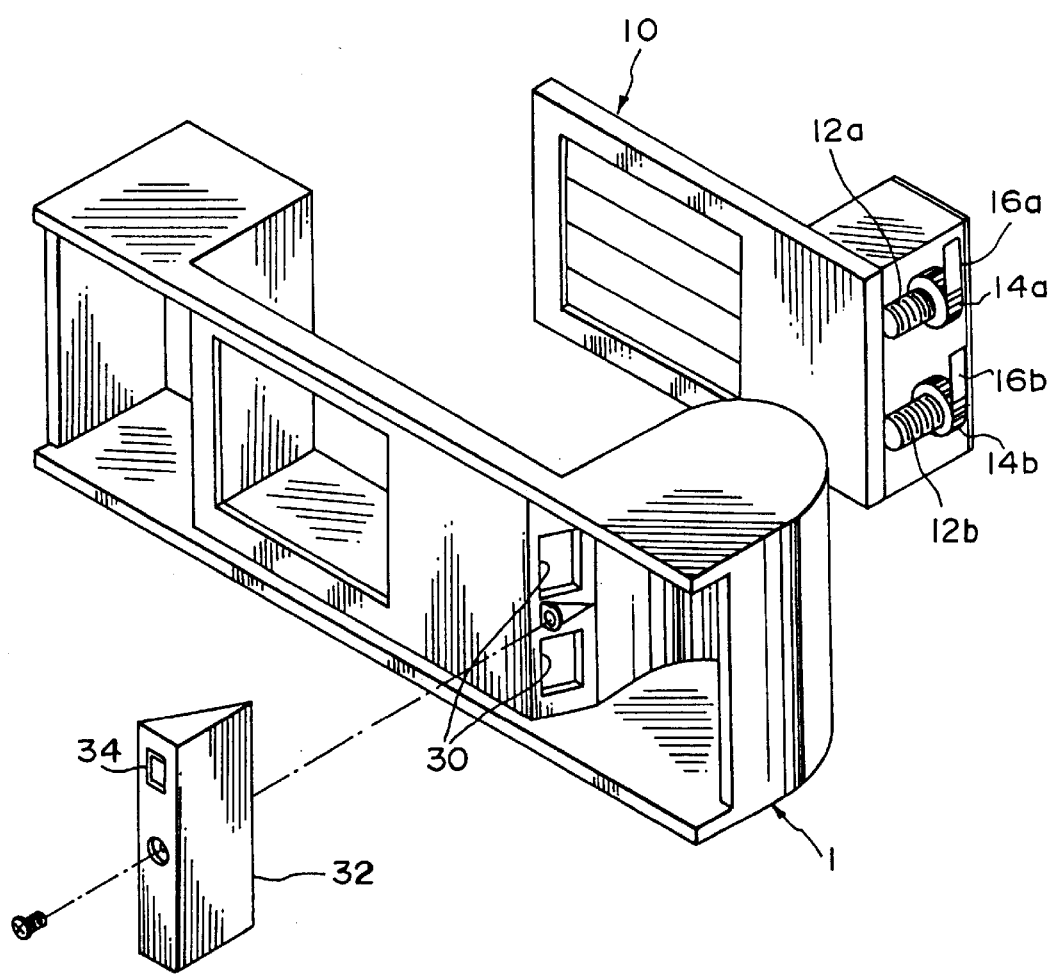
FIG. 3 is an exploded perspective view of a relevant portion of a first embodiment of the present invention.
Figure 4:
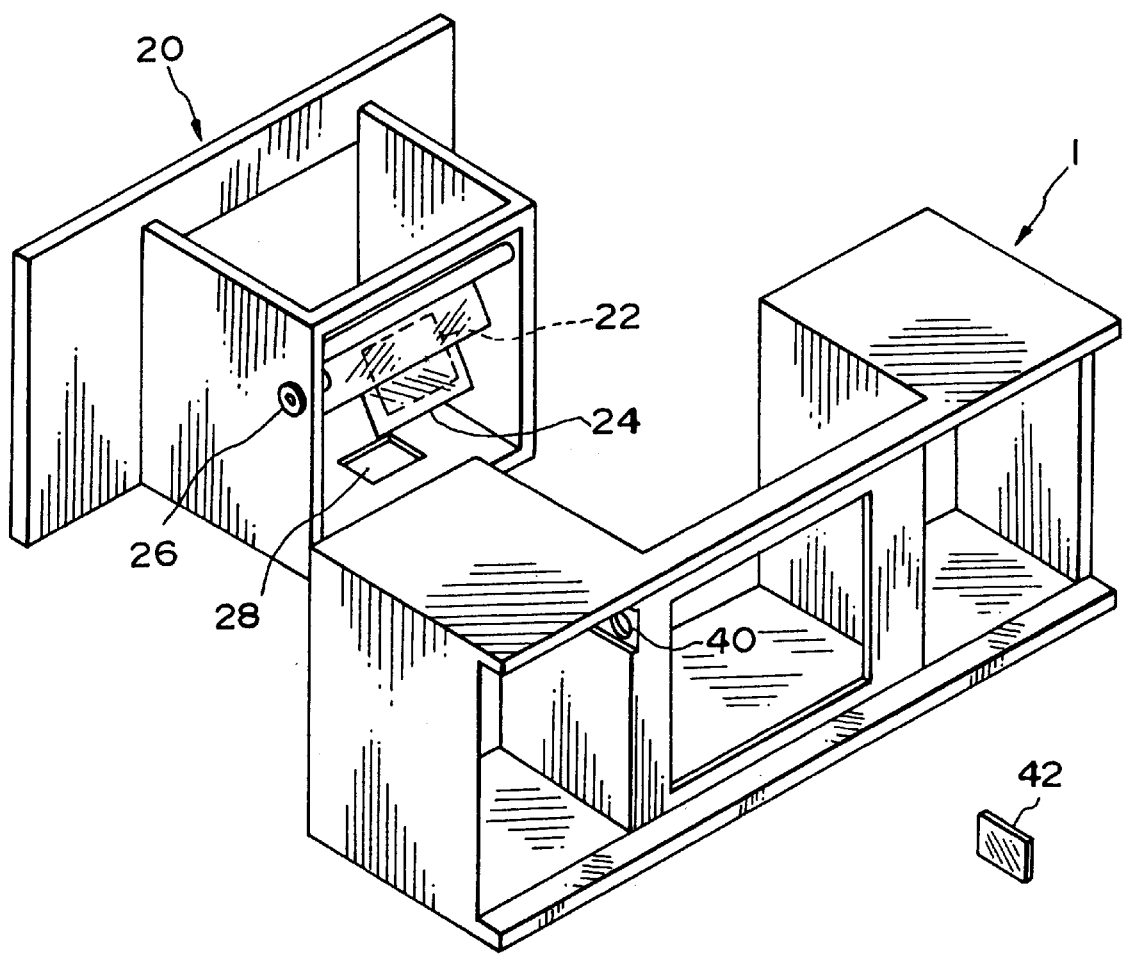
FIG. 4 is an exploded perspective view of a relevant portion of a second embodiment of the present invention.
Figure 5:
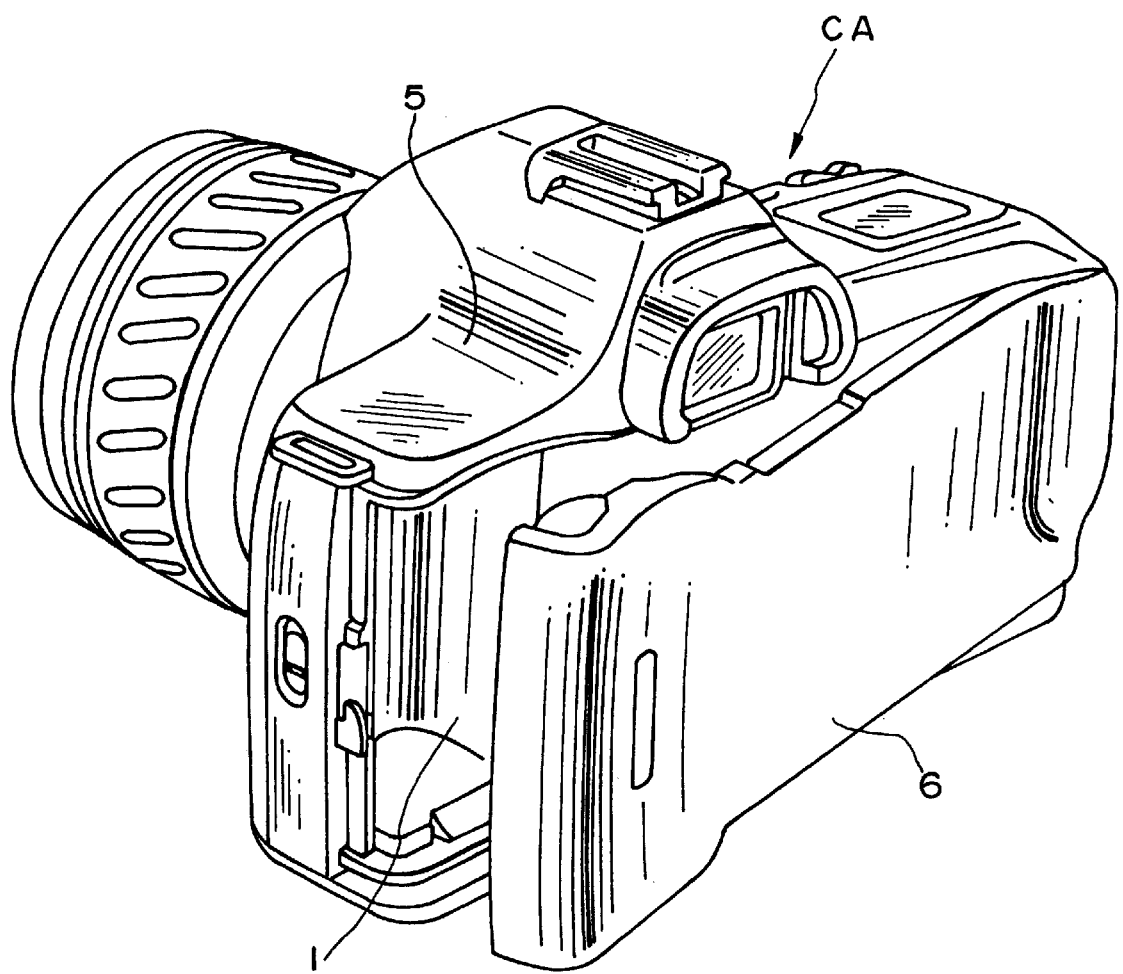
FIG. 5 is a general view of a camera common to the embodiments.

Hereinafter, embodiments of the present invention will be described with reference to FIGS. 3, 4 and 5. The embodiments are single lens reflex cameras of the back-opened type using 35 mm film. The exterior of the whole camera is shown in FIG. 5.

First, a first embodiment shown in the relevant portion exploded perspective view of FIG. 3 will be described with reference also to FIG. 5.

A shutter unit 10 to be incorporated in a camera body 1 is designed so that the transport speeds of the leading and the trailing screens can be adjusted by adjusting the pressure applied to the leading and the trailing screens by a leading screen transport spring 12a and a trailing screen transport spring 12b each comprising a torsion coil spring. Specifically, when a ratchet 14a or 14b being rotatable only in one direction, i.e. in the spring charge direction by being engaged with a claw 16a or 16b is rotated in a predetermined direction, the pressure applied by the spring 12a or 12b increases, so that the transport speed of the leading or the trailing screen increases.

The preliminary adjustment of the transport speeds of the leading and the trailing screens of the shutter unit 10 is performed before the unit 10 is incorporated into the camera body 1. Then, the shutter unit 10 is incorporated into the camera body 1. Then, non-illustrated other parts are incorporated into the camera body 1, and exterior parts such as a cover 5 and a back cover 6 are attached. After a camera CA is substantially finished, the final adjustment is performed with the back cover 6 opened.

That is, on the film winding-up side of the camera body 1, openings 30 are formed in positions faced to the ratchets 14a and 14b when the shutter unit 10 is incorporated in the camera body 1. When the back cover 6 is opened, the ratchets 14a and 14b of the shutter unit 10 being incorporated are seen through the openings 30. The final adjustment is performed after the camera is substantially finished. Specifically, first, the transport speeds of the leading and the trailing screens of the shutter unit 10 are measured. Then, inserting an adjustment tool through the opening 30, the ratchet 14a or 14b of the leading or the trailing screen whose transport speed is lower is rotated by the adjustment tool to increase the speed so as to be the same as the faster speed.

After the final adjustment of the transport speeds of the leading and the trailing screens of the shutter unit 10 is finished, a perforation detection unit 32 having a photointerruptor 34 for detecting perforations of the film is attached so as to cover the openings 30 of the camera body 1, thereby closing the openings 30. This prevents film from being exposed by light leaking in through the openings 30. The perforation detection unit 32 is screwed so that its attachment to the camera body 1 does not distort the camera body 1. Consequently, the attachment of the perforation detection unit 32 does not cause the shutter unit 10 to be out of adjustment.

The camera CA of the above-described embodiment is simple in structure because it is unnecessary to provide the shutter unit 10 with a worm mechanism for adjustment. Moreover, camera size reduction can be achieved by reducing the lateral size of the camera. Further, since the camera CA is in the substantially finished state when the final adjustment of the shutter unit 10 is performed, the attachment of the remaining parts after the final adjustment does not cause the shutter unit 10 to be out of adjustment.

Subsequently, a second embodiment shown in the relevant portion exploded perspective view of FIG. 4 will be described with reference also to FIG. 5.

In the second embodiment, a mirror box 20 to be incorporated in the camera body 1 is designed so that light having passed through a half mirror portion formed in a part of a non-illustrated main mirror is reflected downward at a sub mirror 22 and is then made incident on a focus detection element 28 disposed at the bottom of the mirror box 20. The angle of the sub mirror 22 is adjusted by rotating a decentered pin 26 on which a sub mirror holder 24 for holding the sub mirror 22 abuts.

The preliminary adjustment of the angle of the sub mirror 22 of the mirror box 20 is performed before the box 20 is incorporated into the camera body 1. Then, the mirror box 20 is incorporated into the camera body 1. Then, non-illustrated other parts are incorporated into the camera body, and exterior parts such as the cover 5 and the back cover 6 are attached. After the camera CA is substantially finished, the final adjustment of the angle of the sub mirror 22 is performed with the back cover 6 opened.

That is, on the film cartridge chamber side of the camera body 1, an opening 40 is formed in a position faced to the decentered pin 6 of the mirror box 20 when the mirror box 20 is incorporated in the camera body 1. When the back cover 6 is opened, the decentered pin 26 of the mirror box 20 being incorporated is seen through the opening 40. To perform the final adjustment, the back cover 6 of the camera CA in the substantially finished state is opened, an adjustment tool (e.g. hexagonal wrench) is inserted through the opening 40, and the tip of the adjustment tool is engaged with the hexagonal hole of the decentered pin 26 of the mirror box 20 to rotate the decentered pin 26.

After the final adjustment, a light intercepting sheet 42 is pasted to close the opening 40, thereby preventing film from being exposed by light leaking in from the mirror box 20.

The camera CA of the above-described embodiment is simple in structure because it is unnecessary to provide a complicated interlocking mechanism for adjusting the angle of the sub mirror 22. Moreover, since the external parts such as the cover have already been attached when the final adjustment is performed, it never occurs that distortion of the camera body 1 causes the angle of the sub mirror 22 to be out of adjustment after the final adjustment.

As described above, according to the embodiments of the present invention, the functional units being incorporated can be adjusted after the camera is assembled to the substantially finished state. As a result, the problems of the prior art cameras can be solved.

The above-described embodiments may be modified as follows:

For example, when the attachment of the back cover does not distort the camera body and accordingly, the functional units are not caused to be out of adjustment, a state in which the back cover has not been attached to the camera body can also be regard as the substantially finished state. Therefore, in such a case, the final adjustments of the functional units may be performed before the back cover is attached; the back cover is attached after the final adjustment.

The position where the opening is formed is not limited to the position covered by the back cover; the opening may be formed in any position that is covered with a cover such as a battery chamber cover or a hiding cover for covering a switch, a display panel or a contact.

The present invention is also applicable to advanced photo system cameras. Although having no back covers, the advanced photo system cameras have film cartridge chamber covers opened for loading film cartridge. Therefore, by forming an opening in an interior portion that is seen when the film cartridge chamber cover is opened, the adjustments can be performed in a similar manner to that in the above-described embodiments.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera having an interior space and a cover for covering the interior space and capable of being opened and closed after the camera assembling is finished, said camera comprising:
    a partition provided in said interior space for dividing the interior space into two portions, one of which is a first portion that is not exposed when the cover is opened, and the other of which is a second portion that is not exposed when the cover is closed and is exposed when the cover is opened; and
    a functional unit which performs a certain camera function and which is provided in said first portion, the functional unit having a mechanical adjustment component;
    wherein said partition is provided with an opening through which the functional unit can be adjusted when said cover is opened, said opening exposing the mechanical adjustment component of the functional unit to the second portion of the interior space; and an interior covering placed over said opening to cover said opening.

2. A camera according to claim 1, wherein said interior covering intercepts light.

3. A camera according to claim 1, wherein said functional unit is a shutter unit, and said adjustment is performed for adjusting a shutter screen speed.

4. A camera according to claim 3, wherein said cover is a back cover for covering a film feeding path.

5. A camera according to claim 1, wherein said functional unit is a mirror box, and said adjustment is performed for adjusting an angle of mirror.

6. A camera according to claim 5, wherein said cover is a back cover for covering a film feeding path.

7. A camera according to claim 1, wherein said cover is a back cover for covering a film feeding path.

8. A camera according to claim 7, wherein said interior covering has a perforation detection unit for detecting a film feeding.

9. A method for assembling a camera having a cover capable of being opened and closed after the camera assembling is finished, said method comprising steps of:
    assembling a functional unit which performs a certain camera function;
    incorporating the functional unit into a camera body;
    assembling remaining camera parts into the camera;
    performing an adjustment of a mechanical adjustor of the functional unit with the cover opened, said adjustment performed through an opening formed a) in an interior partition of the camera body, b) in a position where the opening is exposed when the cover is opened and is not exposed when the cover is closed and c) adjacent to the mechanical adjustor of the functional unit; and
    covering the opening with an interior cover after performing the adjustment of the functional unit so that the opening is covered whether the cover is opened or closed.

10. A method for assembling a camera according claim 9, further comprising a step of performing a preliminary adjustment of the functional unit after assembling the functional unit and before the functional unit is incorporated into the camera body.

* * * * *